US008525032B2

(12) United States Patent
Maxwell et al.

(10) Patent No.: US 8,525,032 B2
(45) Date of Patent: Sep. 3, 2013

(54) DEVICE FOR DECREASED RISK OF DIELECTRIC BREAKDOWN IN HIGH VOLTAGE APPARATUSES

(75) Inventors: Andrew Maxwell, Vasteras (SE); Thorsten Schütte, Vasteras (SE)

(73) Assignee: ABB Research Ltd. (CH)

( * ) Notice: Subject to any disclaimer, the term of this patent is extended or adjusted under 35 U.S.C. 154(b) by 28 days.

(21) Appl. No.: 12/956,942

(22) Filed: Nov. 30, 2010

(65) Prior Publication Data

US 2011/0114359 A1 May 19, 2011

Related U.S. Application Data

(63) Continuation of application No. PCT/EP2009/056910, filed on Jun. 5, 2009.

(30) Foreign Application Priority Data

Jun. 10, 2008 (EP) .................................... 08157922

(51) Int. Cl.

| | |
|---|---|
| ***H01B 5/00*** | (2006.01) |
| ***H01B 7/00*** | (2006.01) |
| ***H01B 17/44*** | (2006.01) |
| ***H01B 17/42*** | (2006.01) |
| ***H02G 15/00*** | (2006.01) |
| ***H01S 4/00*** | (2006.01) |

(52) U.S. Cl.
USPC .... 174/127; 174/73.1; 174/135; 174/140 CR; 174/140 R; 29/592.1

(58) Field of Classification Search
USPC ................ 174/73.1, 120 SC, 140 CR, 140 R, 174/138 J, 105 SC, 40 R, 15.5, 126.1, 126.4, 174/127, 137 A, 179, 350, 135; 29/592.1
See application file for complete search history.

(56) References Cited

U.S. PATENT DOCUMENTS

| | | | | | |
|---|---|---|---|---|---|
| 2,789,154 | A | * | 4/1957 | Peterson | 174/73.1 |
| 2,953,628 | A | * | 9/1960 | Winter et al. | 174/142 |
| 3,643,004 | A | * | 2/1972 | McKean | 174/36 |
| 3,828,116 | A | * | 8/1974 | Lonow | 174/73.1 |
| 3,930,113 | A | * | 12/1975 | Johansen et al. | 174/40 R |

(Continued)

FOREIGN PATENT DOCUMENTS

| | | | |
|---|---|---|---|
| BE | 426653 | A | 2/1938 |
| FR | 582145 | A | 12/1924 |
| GB | 2117983 | A | 10/1983 |
| WO | 2007149015 | A1 | 12/2007 |

OTHER PUBLICATIONS

International Preliminary Report on Patentability; PCT/EP2009/056910; Jun. 14, 2010; 9 Pages.

(Continued)

*Primary Examiner* — Timothy Thompson
*Assistant Examiner* — Sherman Ng
(74) *Attorney, Agent, or Firm* — St. Onge Steward Johnston & Reens LLC

(57) ABSTRACT

A device including a corona shield, and at least one support element for connecting the corona shield to a high voltage apparatus. The at least one support element includes a semi-conducting polymer, which, when in operation, acts as a resistance between the corona shield and the high voltage apparatus. Furthermore the support element is arranged to fix the corona shield to the high voltage apparatus.

11 Claims, 4 Drawing Sheets

(56) References Cited

U.S. PATENT DOCUMENTS

| | | | | | |
|---|---|---|---|---|---|
| 4,025,715 | A | * | 5/1977 | Foley et al. | 174/36 |
| 4,355,200 | A | * | 10/1982 | Wheeler et al. | 174/140 S |
| 4,505,033 | A | * | 3/1985 | Wheeler | 29/887 |
| 4,584,429 | A | * | 4/1986 | Raketti et al. | 174/18 |
| 4,584,431 | A | * | 4/1986 | Tippie et al. | 174/107 |
| 5,877,453 | A | * | 3/1999 | Hill | 174/179 |
| 6,130,495 | A | * | 10/2000 | Schulten et al. | 310/196 |
| 6,388,197 | B1 | * | 5/2002 | Zhao et al. | 174/140 CR |
| 6,525,265 | B1 | * | 2/2003 | Leijon et al. | 174/15.5 |
| 2007/0091970 | A1 | * | 4/2007 | Daharsh et al. | 372/60 |

OTHER PUBLICATIONS

International Search Report and Written Opinion of the International Searching Authority; PCT/EP2009/056910; Aug. 17, 2009; 8 Pages.

European Search Report; Application No. EP 08 15 7922; Oct. 24, 2008; 5 pages.

* cited by examiner

DEVICE FOR DECREASED RISK OF DIELECTRIC BREAKDOWN IN HIGH VOLTAGE APPARATUSES

CROSS-REFERENCE TO RELATED APPLICATIONS

The present application is a continuation of pending International patent application PCT/EP2009/056910 filed on Jun. 5, 2009, which designates the United States and claims priority from European patent application EP 08157922.9 filed on Jun. 10, 2008, the content of which is incorporated herein by reference.

FIELD OF THE INVENTION

The present invention relates generally to high voltage apparatuses, and more particularly to reducing the risk of dielectric breakdowns in high voltage apparatuses.

BACKGROUND OF THE INVENTION

Within high voltage applications it is known in the art to provide corona shields of an electrically conductive material, usually metal, in geometric and electric connection to a high voltage conductor or other high voltage equipment. By distributing the electrical charge over the increased surface area of the shield, the maximum electrical field strength is reduced, thereby reducing the risk of corona discharge.

One disadvantage with such an arrangement is that due to the large curvature and geometrical extension, a zone with relatively high and homogenous electrical field is created. This enables propagation of discharges that can be triggered by small temporary disturbances, such as insects, large dust particles, etc. When high voltages are applied, particularly DC, it has been observed that this mechanism can causes breakdown at voltages which are significantly lower than is expected from conventional design rules.

International application with the publication number WO 2007/149015 discloses providing a resistor between the shield and a valve group in a high voltage direct current application.

While this resistor reduces the risk of such breakdown, it adds to the complexity of a corona shield.

SUMMARY OF THE INVENTION

An object of the present invention is to provide a simpler and more stable way of reducing the risk for breakdown from corona shields.

According to a first aspect of the invention, it is presented a device comprising: a corona shield; and at least one support element for connecting the corona shield to a high voltage apparatus. The at least one support element comprises a semiconducting polymer, which, when said device is in operation, acts as a resistance between the corona shield and the high voltage apparatus. Furthermore the support element is arranged to fix the corona shield to the high voltage apparatus.

By using the support element with the resistance to fix the corona shield, a less complex and more stable structure is obtained. It provides a greatly improved freedom in design of the support elements. Furthermore, since the structures of the polymer based resistor can be made long, the drop in voltage over length is reduced compared to if a conventional resistor is used. This reduces the risk for surface discharges. For a conventional resistor there is a risk that an electrical discharge can start from one of its end fittings due to the local high electric field strength. Bridging over the resistor, the discharge short circuits it, supplying essentially full voltage to the corona shield. The end fittings of the conventional resistor could be equipped with field reducing shields, but this increases complexity in the rather limited space available.

The at least one support element may have a resistance in the range of 100 kiloohm to 100 megaohm.

The semiconducting polymer may comprises a non-conducting polymer with a conducting filler. The non-conducting polymer may be selected from the group consisting of: polyethylene, cross linked polyethylene, polypropylene, polyvinylchloride, polystyrene, polyurethane, epoxy resins, phenol based resins, polymer blends and copolymers, or any combination of these. The semiconducting polymer can in principle be an intrinsic semiconducting polymer as polypyrrole. More practical and economical are conventional polymers with a conducting filler, usually carbon black.

At least one of the at least one support element may have a cross shaped cross section. The tubular cross section provides a support element with increased strength in relation to material use, and thereby weight. Other cross sectional shapes can be selected, such as any shape in the group consisting of: a tubular shape, a square shape, a rectangular shape, an I shape or a circular shape.

At least one of the at least one support element may comprise a core of the semiconducting polymer and an outer layer made of an outer material which is more durable when exposed to air than the semiconducting polymer. By providing a more durable outer layer, the life span of the semiconducting polymer is increased, increasing mean time between maintenance and/or failure. The strength and conductivity can be tuned by selecting different thicknesses of the materials and different material combinations.

The outer material can be made of the same polymer as the conductive polymer, but without filler, other polymers or of a varnish/paint, e.g. alkyd varnish.

The support element may further comprise: a first conducting element connected to the corona shield on one end and the semiconducting polymer on a second end.

The support element may further comprise: a second conducting element connected to the semiconducting polymer on a first end and the second conducting element is arranged to be connected to the high voltage apparatus on a second end.

The semiconducting polymer may be attached to the corona shield and the semiconducting polymer may be arranged to be attached to the high voltage apparatus.

The corona shield may be substantially toroidal with at least an outer layer comprising a metal.

A second aspect of the invention is a high voltage wall bushing comprising the device according to the first aspect.

A third aspect of the invention is a method for manufacturing a device. The method comprises the steps of: providing at least one support element comprising a semiconducting polymer, which, when the device is in operation, acts as a resistance between a corona shield and a high voltage apparatus; and mounting the at least one support element between a corona shield and a high voltage apparatus.

The step of providing may further comprise: providing a dielectric core for each of the at least one support element; and applying the semiconducting polymer by spray painting a layer of the semiconducting polymer on each of the at least one support elements. By spray painting it is possible to get a thin layer of semiconducting polymer, with dimensions that alleviate achieving a large resistance.

The step of providing at least one support element may further comprise: providing a dielectric layer on an exterior side of the layer of the semiconducting polymer.

It is to be noted that any feature of the first, second and third aspects may, where appropriate, be applied to any other aspect.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION OF THE INVENTION

The present invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
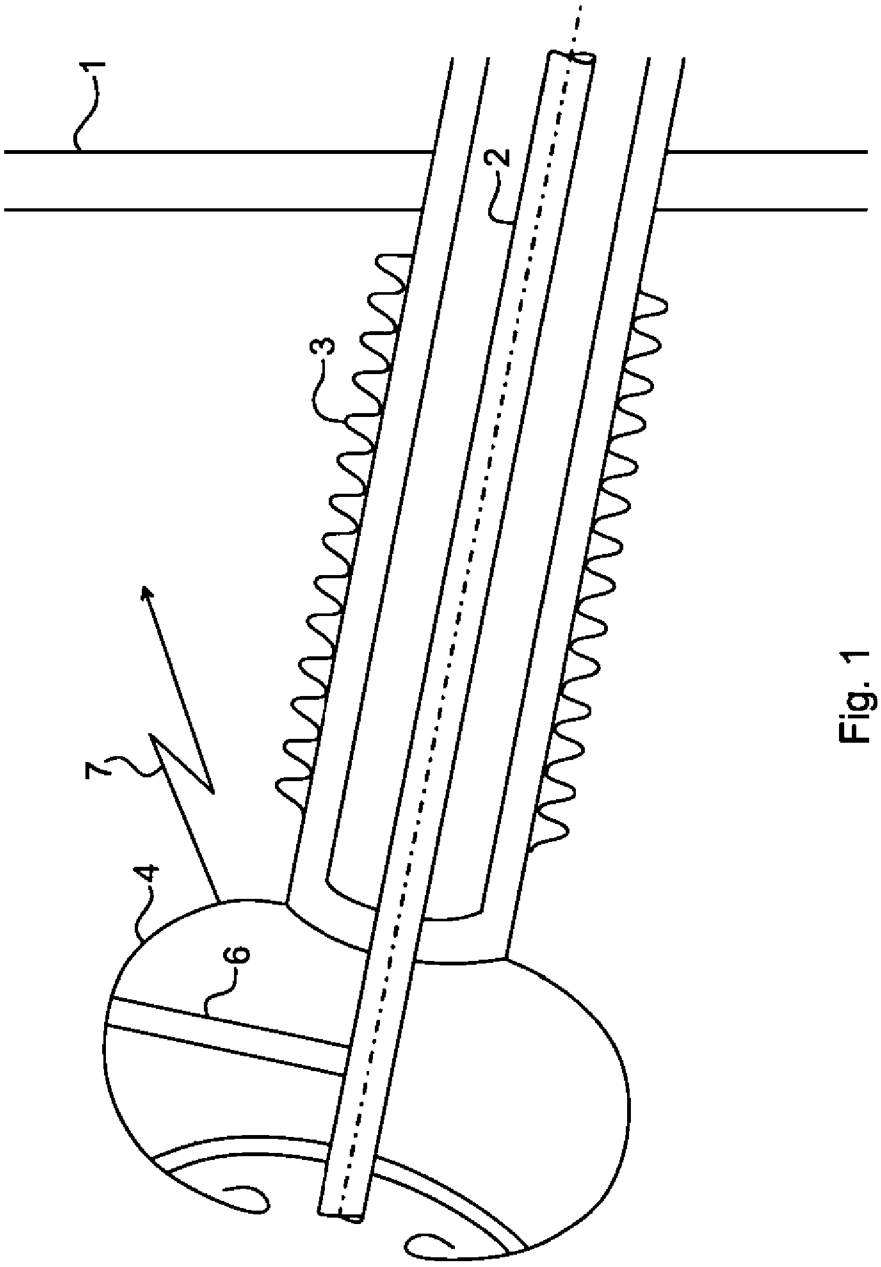
FIG. 1 shows an embodiment of the present invention applied to a wall bushing.

FIG. 1 shows an embodiment of the present invention applied to a wall bushing. A high voltage conductor 2 carries a high voltage electrical current. For example, the voltage can be anywhere between 50 kV to 1000 kV or even more. It is to be noted that the current invention is applicable to both DC (Direct Current) and AC (Alternating Current), whenever the voltage is high enough in relation to its environment for dielectric breakdowns to potentially occur.

An insulator 3 is provided around the conductor 2 all the way through a wall 1. At one end of the insulator 3, a corona shield 4 is provided. The corona shield is typically substantially toroidal with at least an outer layer comprising a metal. Alternatively, the corona shield can be substantially spherical.

The corona shield 4 is connected to the conductor 2 via a support element 6. The support element 6 comprises a semiconducting polymer. Being semiconducting, the polymer is conductive, but provided with a significant resistance. The total resistance between the conductor 2 and the corona shield 4 is preferably between about 100 kiloohm and about 100 megaohm. The exact value will depend on the geometry and the capacitance, and may need verified for each individual case. If the resistance is too low, the voltage drop during a beginning dielectric breakdown is too low. If the resistance is too high, it is difficult to keep the corona shield 4 at the same potential as the conductor 2. The polymer can be any suitable semiconducting polymer providing a total resistance within the indicated operating range. The semiconducting polymer may comprise a non-conducting polymer with a conducting filler, wherein the non-conducting polymer may be a conventional polymer selected from the group consisting of: polyethylene (PE), cross linked polyethylene (PEX), polypropylene (PP), polyvinylchloride (PVC), polystyrene (PS), polyurethane (PUR), epoxy resins, phenol based resins (bakelite), also including polymer blends and copolymers, or any combination of these. The semiconducting polymer can in principle be an intrinsic semiconducting polymer as polypyrrole. More practical and economical are conventional polymers with a conducting filler as described above, where the conducting filler is usually carbon black.

It is to be noted that the resistance may vary significantly within a determined operating range, allowing the use of polymer based resistors. For instance, even though the resistance of many polymer materials of today vary with temperature, these materials are still functional as resistances for this use. Also, if several support elements 6 are utilized, the equivalent total resistance should remain within the ranges indicated above.

Because of the resistance of the support element 6, the corona shield has better protection for dielectric breakdowns. This results in a significantly reduced risk of breakdown due to anomalies.

This mechanism works as follows. When in normal operation, there is no discharge from the corona shield 4. There is no current flowing out of the corona shield 4 and no current flows through the support element 6. Since there is no current, there is no significant voltage drop over the support element 6, whereby the corona shield 4 is provided with the same voltage as the conductor 2. When a discharge 7 is triggered, e.g. by an anomaly, a current flows from the corona shield into the discharge which grows towards the remote object, e.g. the wall 1. The current draws power from the conductor 2, whereby a current flows through the support element 6. Due to the high resistance of the support element 6, there is a resulting voltage drop from the conductor 2 to the corona shield 4. At least in some cases, this voltage drop is sufficient for the discharge 7 to stop, due to an insufficient voltage difference between the corona shield and the remote object, e.g. the wall 1.

It is to be noted that the support element 6 is a sufficiently rigid structure to be able to fix the corona shield to the conductor 2.

Figure 2A:
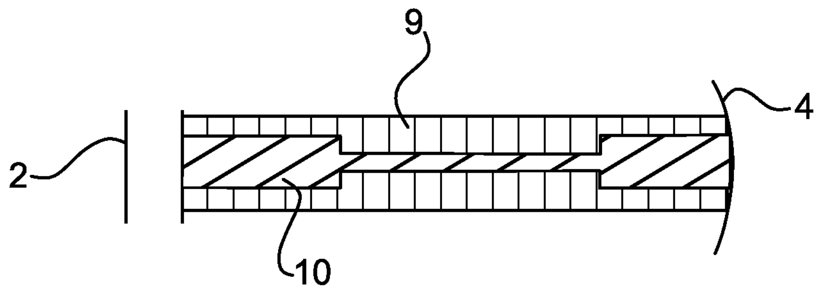
FIGS. 2*a-c* are schematic drawings of how the supporting member can be embodied.
Figure 2B:
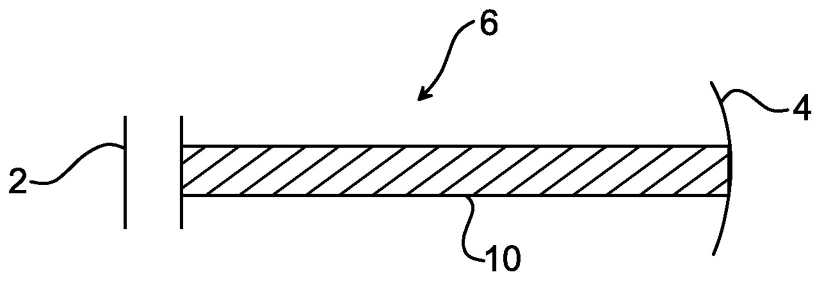
Figure 2C:
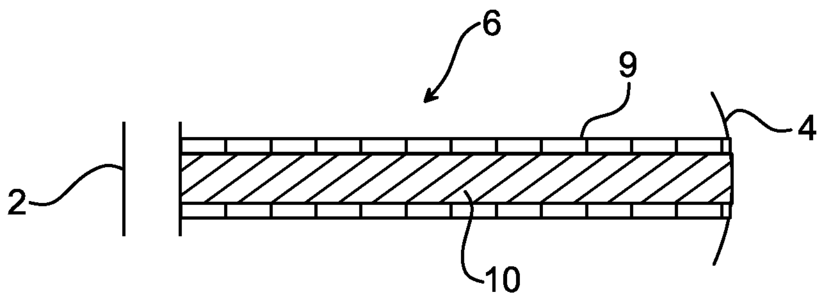

FIGS. 2*a-c* are schematic drawings of how the support element 6 can be embodied. In FIG. 2*a*, the support element 6 comprises a polymer based resistor 10. The resistor is thinner in the centre section to achieve a resistance which is large enough for this application. The polymer based resistor 10 is provided with an outer layer 9 made of a material which is more durable than the semiconducting polymer. This outer layer 9 thus prevents, or at least reduces, aging of the polymer based resistor due to oxidation, etc. The outer layer 9 is made of any suitable material which is more durable when exposed to air than the semiconducting polymer. For example, the outer layer 9 can be made of the same polymer as the conductive polymer, but without filler, other polymers or of a varnish/paint, e.g. alkyd varnish. The outer layer could also be made of silicone rubber, ethylene propylene diene monomer (EPDM) rubber, ethylene-vinyl acetate (EVA), epoxy, etc. The thickness and rigidity of the outer layer 9 also helps to provide a stable mechanical structure.

In FIG. 2*b*, an embodiment is shown where the polymer based resistor 10 makes up the entire support element 6, connecting to both the corona shield 4 and the conductor 2, whereby the corona shield 4 is fixed to the conductor 2.

In the embodiment shown in FIG. 2*c*, again the polymer based resistor 10, of the support element 6, connects directly to both the corona shield 4 and the conductor 2. However, here the polymer based shield is provided with the protective outer layer 9.

It is to be noted that the polymer based resistor 10 of any of the embodiments illustrated in FIGS. 2*a-c* can have any cross sectional shape, for example any one of the cross sectional shapes shown in FIGS. 3*a-k*, as detailed below.

FIGS. 3*a-k* are schematic diagrams showing cross sections of a section of the support element 6 where the polymer based resistor 10 is present, in various embodiments. It is to be noted that the support element can for example be the support element 6 shown in any of the FIGS. 2*a-c*.

Figure 3A:
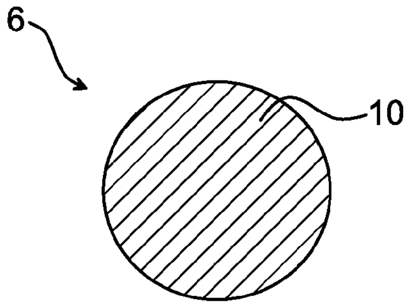
FIGS. 3*a-k* are schematic diagrams showing cross sections of a section of the support element where the polymer based resistor is present.
Figure 3B:
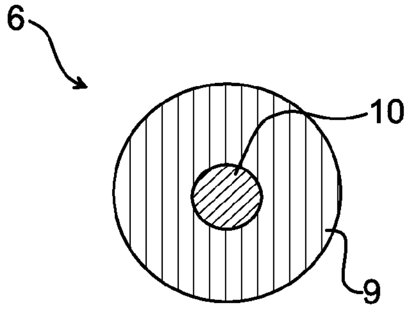

FIG. 3*a* illustrates the support element 6 where the cross section of the polymer based resistor 10 is substantially circular. FIG. 3*b* illustrates the same support element as FIG. 3*a*, but here the support element comprises the outer protective layer 9.

Figure 3C:
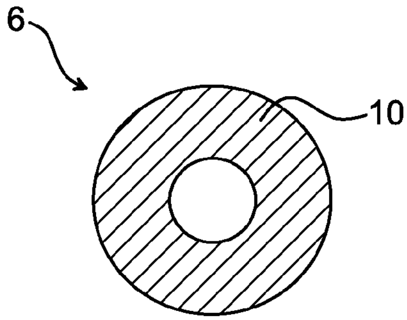
Figure 3D:
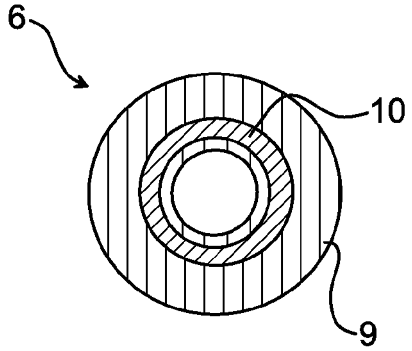

FIG. 3*c* illustrates the support element 6 where the cross section of the polymer based resistor 10 is tubular. FIG. 3*d* illustrates the same support element as FIG. 3*c*, but here the support element comprises the outer protective layer 9. Note that the protective layer is optionally provided on both sides of the tubular shaped polymer based resistor 10. The tubular shape provides good stability in relation to the amount of material (and therefore also weight) that is required for the polymer based resistor 10.

Figure 3E:
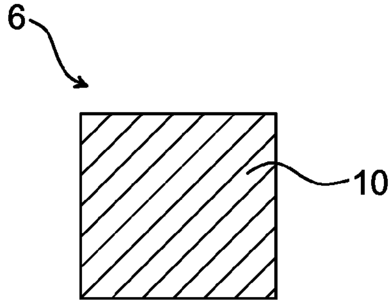
Figure 3F:
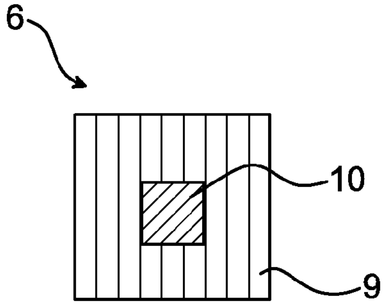

FIG. 3*e* illustrates the support element 6 where the cross section of the polymer based resistor 10 is substantially rectangular or square shaped. FIG. 3*f* illustrates the same support element as FIG. 3*e*, but here the support element comprises the outer protective layer 9.

Figure 3G:
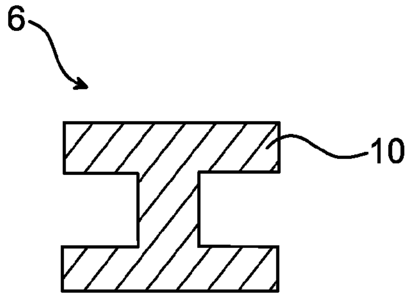
Figure 3H:
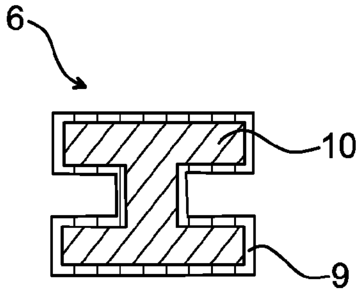

FIG. 3*g* illustrates the support element 6 where the cross section of the polymer based resistor 10 is I-shaped. FIG. 3*h* illustrates the same support element as FIG. 3*g*, but here the support element comprises the outer protective layer 9. The I shape is another shape with large stability in relation to material requirement.

Figure 3I:
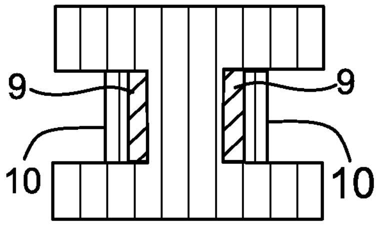

FIG. 3*i* illustrates a support element 6 where the cross section is I-shaped, but the centre section 9 is made of a dielectric material, e.g. the material of the outer layer as described previously. In the inner sections the polymer based resistor 10 is provided as a thin layer. The thin layer can be attached as a thin solid piece. Alternatively, the thin layer can be spray painted on the centre section. In this embodiment, the thickness of the polymer based resistor is preferably between 0.1 mm and 2 mm. If the thickness is less than 0.1 mm, there is a risk of mechanical breaking of the polymer based resistor, which would also break the electrical connection. If the thickness is more than 2 mm, it may be easier to provide the polymer based resistor in other ways than spray painting. It is to be noted that the method of spray painting is applicable to any suitable cross sectional shape, not only the I-shape as described here.

Figure 3J:
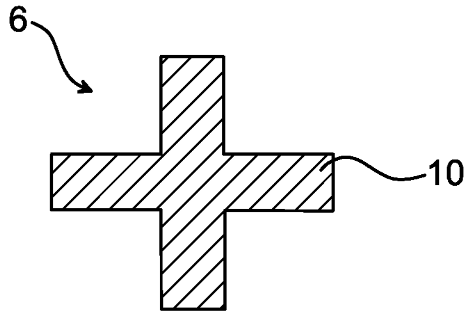
Figure 3K:
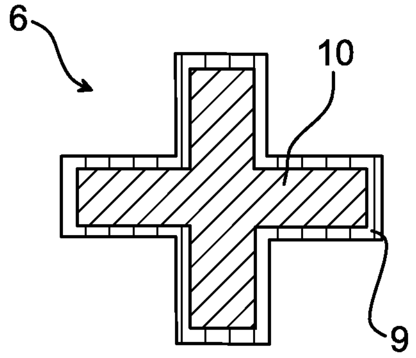

FIG. 3*j* illustrates the support element 6 where the cross section of the polymer based resistor 10 is cross shaped. FIG. 3*k* illustrates the same support element as FIG. 3*j*, but here the support element comprises the outer protective layer 9.

Figure 4A:
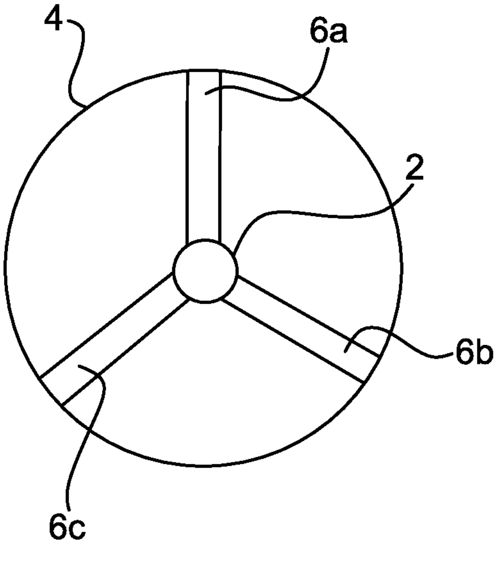
FIGS. 4*a-b* are schematic diagrams of two embodiments illustrating how the corona shield can be fixed to the conductor.
Figure 4B:
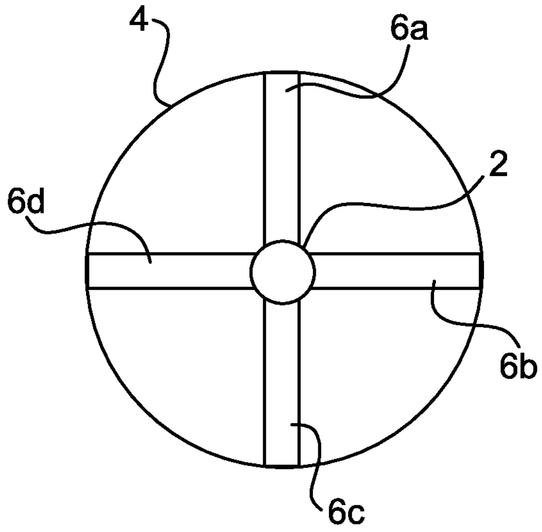

FIGS. 4*a-b* are schematic diagrams of two embodiments illustrating how the corona shield 4 can be fixed to the conductor 2.

In FIG. 4*a*, the corona shield 4 is fixed to the conductor 2 using three support elements 6*a-c*. As is known in the art per se, if the resistance for each individual support element is equal, the equivalent resistance between the conductor 2 and the corona shield 4 is a third of the resistance through one support element. It is to be noted that the support elements can be a mixture of support elements with a semiconducting polymer as described above, and conventional dielectric support elements, as long as at least one support element comprises the semiconducting polymer.

In FIG. 4*b*, the corona shield 4 is fixed to the conductor 2 using four support elements 6*a-d*. It is to be noted that any number of suitable support elements can be used, the number of support elements being a balance between stability and cost/complexity.

While the invention is illustrated above as implemented in a wall bushing, any high voltage apparatus where a corona shield is beneficial would also benefit from the present invention. For example, the present invention can be embodied in a high voltage power transformer bushing, a high voltage measuring transformer, a high voltage switchgear, a high voltage line insulator, a high voltage surge arrester or in conjunction with HVDC (High Voltage Direct Current) valves.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A device comprising:

a corona shield being arranged to surround a high voltage conductor of a high voltage apparatus; and at least one support element for connecting said corona shield to the high voltage conductor of the high voltage apparatus, characterised in that said at least one support element comprises a semiconducting polymer, which, when said device is in operation, acts as a resistance between said corona shield and said high voltage apparatus, and said support element is arranged to fix said corona shield to said high voltage apparatus;

wherein at least one of said at least one support element comprises a core of said semiconducting polymer and an outer layer made of an outer material which is more durable when exposed to air than said semiconducting polymer.

2. The device according to claim 1, wherein said at least one support element has a resistance in the range of 100 kiloohm to 100 megaohm.

3. The device according to claim 1, wherein said semiconducting polymer comprises a non-conducting polymer with a conducting filler.

4. The device according to claim 1 wherein said non-conducting polymer is selected from the group consisting of: polyethylene, cross linked polyethylene, polypropylene, polyvinylchloride, polystyrene, polyurethane, epoxy resins, phenol based resins, polymer blends and copolymers, or any combination of these.

5. The device according to claim 1, wherein at least one of said at least one support element has a cross shaped cross section.

6. The device according to claim 1, wherein said semiconducting polymer is attached to said corona shield and said semiconducting polymer is arranged to be attached to said high voltage apparatus.

7. The device according to claim 1, wherein said corona shield is substantially toroidal with at least an outer layer comprising a metal.

8. A high voltage wall bushing comprising the device according to claim 1.

9. A method for manufacturing a device characterised by the steps of:

providing at least one support element comprising a semiconducting polymer, which, when said device is in operation, acts as a resistance between a corona shield and a high voltage conductor of a high voltage apparatus;

providing a core and an outer layer for each of said at least one support element, said outer layer being made of an outer material which is more durable when exposed to air than said semiconducting polymer; and mounting said at least one support element between a corona shield and a high voltage apparatus such that the corona shield surrounds the high voltage conductor.

10. The manufacturing method according to claim 9, wherein said step of providing further comprises:

providing a dielectric core for said core for each of said at least one support element; and applying said semiconducting polymer by spray painting a layer of said semiconducting polymer on each of said at least one support elements.

11. The manufacturing method according to claim 10, wherein said step of providing at least one support element further comprises:

providing a dielectric layer on an exterior side of said layer of said semiconducting polymer.

* * * * *